Figure 1:
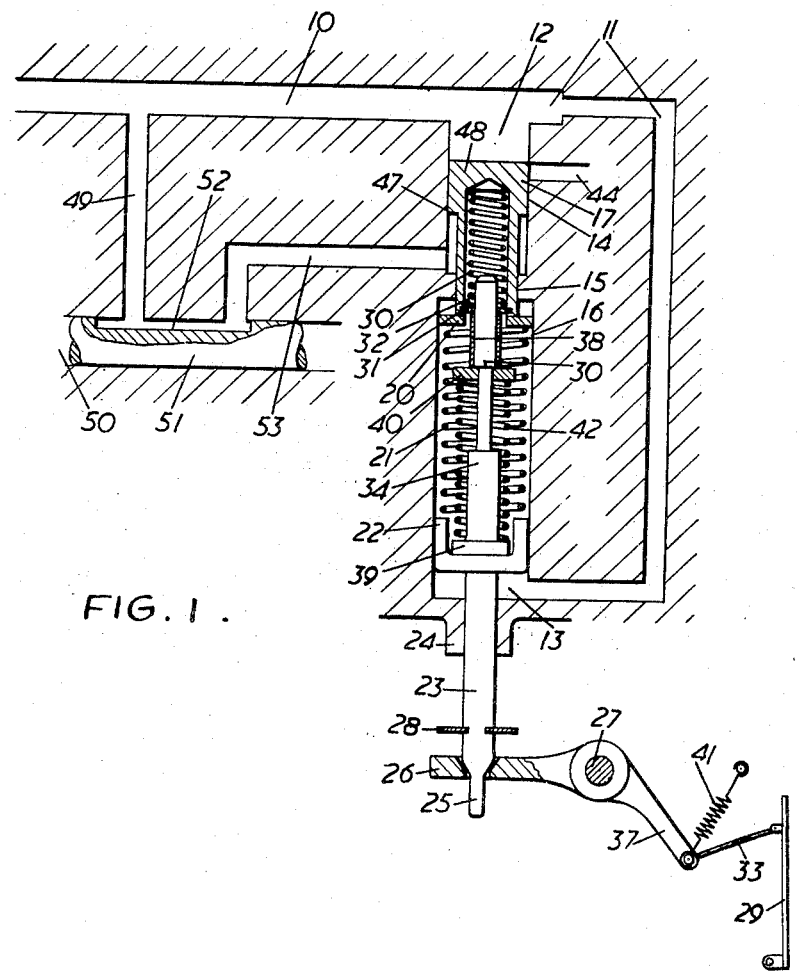

Dec. 9, 1958     H. F. HOBBS     2,863,327
POWER TRANSMISSION APPARATUS

Filed May 4, 1956     3 Sheets-Sheet 2

HOWARD FREDERICK HOBBS
INVENTOR
by Irwin A. Thompson
ATTORNEY

United States Patent Office 2,863,327
Patented Dec. 9, 1958

2,863,327

POWER TRANSMISSION APPARATUS

Howard F. Hobbs, Leamington Spa, England, assignor to Hobbs Transmission Limited, Leamington Spa, England, a British company Application May 4, 1956, Serial No. 582,883

Claims priority, application Great Britain June 13, 1955

6 Claims. (Cl. 74—472)

This invention relates to power transmission apparatus of the kind in which changes in ratio are made by the engagement and disengagement of one or more friction clutches or brakes which are actuated by hydraulic pressure, and which incorporates a pressure relief valve which controls the pressure in the hydraulic system and which is associated with the throttle control of the engine to which the transmission apparatus is attached so that the pressure in the system, or pressures in various parts of the system, is varied in accordance with the position of the throttle, thereby varying the pressure in accordance with the torque output of the engine. It is desirable in a transmission apparatus of this kind to provide comparatively low operating hydraulic pressure when the throttle is shut so as to ensure that the changes in ratio are made smoothly, for example when coming to rest, but it is also necessary to have sufficient pressure when the throttle is opened to transmit the power without slip. The engine may develop considerable torque at low speed even with the throttle opened a small amount.

The object of the present invention is to provide a relief valve connected to the throttle control of an engine which is adapted to provide (1) some given low pressure when the throttle is fully released (e. g. in a motor-car the accelerator pedal is released so that the throttle is at its minimum opening), (2) increased pressure when the throttle opening is slightly increased, and (3) substantially the maximum pressure when the throttle is moved some predetermined part of its travel.

One of the difficulties with the throttle connected type of relief valve is the additional load imparted to the throttle pedal of a vehicle so fitted, particularly when it is required to increase the pressure rapidly over a comparatively small part of the travel of the pedal.

According to the invention, a relief valve comprises a piston in a bore, which can be urged against the pressure in the system by means of three springs, viz. (1) a first spring which acts on the piston and provides a given minimum pressure, (2) a second spring of higher rate than the first spring which can be compressed by a pin operatively connected to the throttle control member (e. g. the accelerator pedal) and which spring is mounted within the relief valve piston and retained therein under compression and arranged to be ineffective when the throttle is completely released, but owing to its initial compression increasingly effective when the throttle opening is slightly increased, and (3) a third spring or springs of lower rate than the second spring carried by the pin so that when a given compression of the high rate spring is obtained by movement of the pin, the spring (3) will yield thereby providing a lower rate of increase with increased movement of the control member.

According to a further feature of the invention, the pin is associated with a second piston working in a bore connected to the hydraulic pressure system of the transmission, whereby the pressure acting on the piston will partially overcome the loads on the pin produced by the compression of the springs thereby reducing the load to be applied by a throttle pedal.

Figure 2:
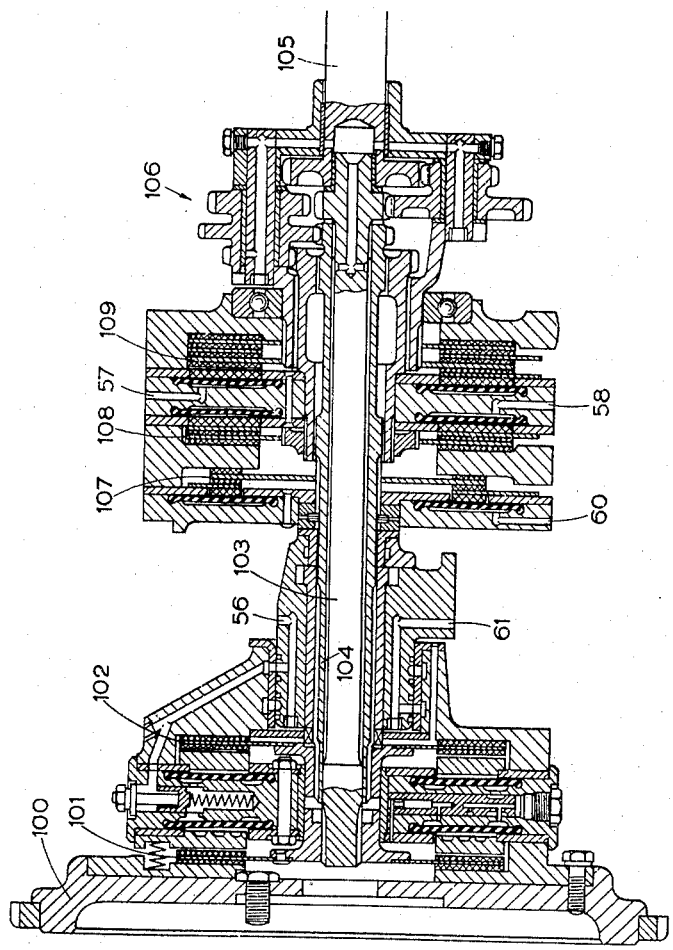
Figure 3:
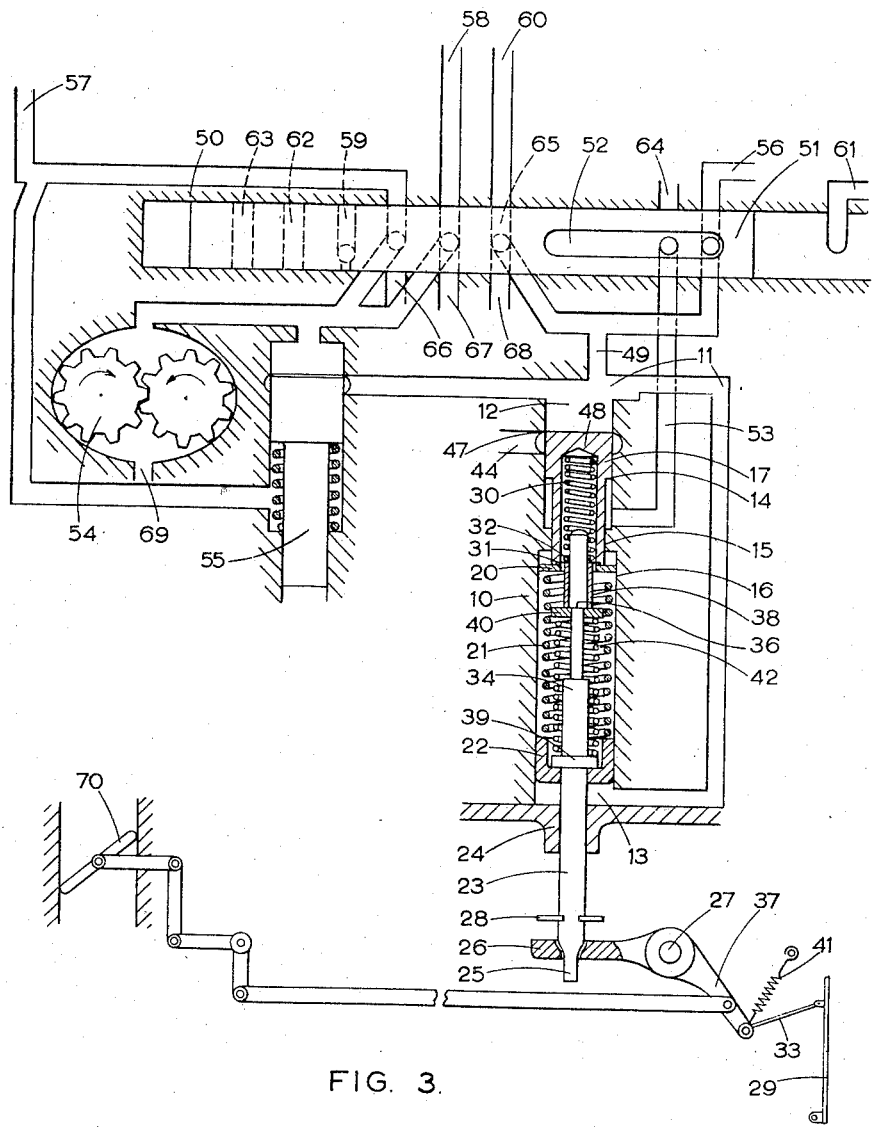

The invention will now be described by way of example with reference to the accompanying diagrammatic drawing wherein: Figure 1 is a sectional view of a valve made in accordance with the invention; Figure 2 is a sectional view of a transmission to which the invention can be applied; and Figure 3 is a view similar to Figure 1 with the additional showing of connections to other parts of the transmission.

A valve block 10 contains a channel 11 which is connected to an oil pump output and through a control valve (not shown) to the brakes and/or clutches to be controlled. The channel 11 is in direct communication with both ends 12, 13 of a bore which consists of three parts 14, 15, 16 of different diameters, the part 15 of smallest diameter being between the part 14 of intermediate diameter and the part 16 of largest diameter.

The part 14 contains a valve piston 17 which piston has a part of larger diameter slidably engaging the bore part 14 and a part of smaller diameter slidably engaging the bore part 15.

The smaller end of the piston 17 seats on a ring 20 that slides in the bore part 16, the ring 20 being under pressure from a first spring 21 that engages between the ring 20 and a plunger 22 that also is slidably engaged in the bore part 16 and is carried by a rod 23 that passes out of the valve block 10 through a hole in a boss 24. This rod 23 has a part 25 of reduced diameter engaged in a hole in a lever 26 that is carried by a pivot 27 which is actuated by the throttle control member of the engine with which the apparatus is associated, e. g. an accelerator pedal 29 connected by link 33 and arm 37 to the lever 26. The lever 26 can return by sliding over the reduced diameter part 25 even if the valve rod 23 should jam. The rod 23 carries a stop ring 28 for the purpose of limiting the travel of the rod 23. A spring 41 urges the parts 33, 37, 29, in the throttle closing direction.

The piston 17 is hollow and contains the second spring 30 which is held in position under an initial load by a spring ring 31. A washer 32 is interposed between the spring 30 and the ring 31.

A pin 34 has a part of reduced diameter which forms a shoulder 36. The pin carries three abutments. The first abutment 38 is in the form of a sleeve slidable on the pin and normally spaced from the washer 32 to provide a small amount of lost motion.

The second abutment 39 is a fixed part of the pin 34 and the third abutment 40 slidable on the reduced diameter part of the pin and seating against the shoulder 36. The third spring 42 is engaged under an initial loading between the abutments 39, 40.

The valve member 10 has an exhaust duct 44 communicating with the bore part 14.

The reduced diameter part of the piston 17 forms a shoulder 47 having an area less than the area of the head surface 48. Fluid pressure from channel 11 is led by a duct 49 to a valve cylinder 50 containing a valve member 51 having a groove 52 therein which provides communication between the duct 49 and a duct 53 which is in communication with the bore part 14 at the reduced diameter part of the piston 17 so as to provide a pressure on the area 47 counter to the pressure on the area 48. The member 51 is movable to cut off this counter pressure in at least one transmission ratio, e. g. top gear (direct drive) whereby higher fluid pressures exist in the channel 11 in higher transmission ratios so that in these ratios in which higher torque is transmitted the engaging pressures of the clutches and brakes will be increased as compared with direct drive.

The spring 30 is a higher rate spring than the spring 42 but has a lower initial loading. For example in a particular example the rate of the spring 30 is 40 lb. per inch of compression and the rate of the spring 42 is 10 lb. per inch of compression; the initial loading on the spring 30 is 4 lb. and the initial loading is 14 lbs.; the rate of the spring 21 is 5 lb. per inch of compression.

In the normal positions of the parts, i. e. when the throttle control is released, the pressure of the spring 21 and the fluid pressure on the area 47, tends to move the valve piston 17 to close the exhaust duct 44 against the pressure in the channel 11 acting on the valve piston area 48. The pressure in the channel 11 is determined accordingly. A small opening of the throttle brings the abutment 38 up to the ring 32. Further opening of the throttle results in compression of the spring 30 since its initial loading is less than that of the spring 42. Consequently the pressure of fluid in the channel 11 will increase accordingly. As the throttle is opened still further the spring 30 becomes loaded up to the initial loading of the spring 42 whereafter further throttle opening results in further compression of the spring 42 as well as the compression of springs 21 and 30 with consequent increase of pressure in the channel 11 available for engaging the clutches and brakes.

It would be possible to reduce the load and the force exerted by the springs by reducing the effective area of the relief valve. A valve of this kind should however be of such dimensions as to permit relatively unrestricted flow of the oil or other fluid; also if it is designed with small effective areas and light springs the tendency to stick is increased. A valve constructed according to the present invention however may advantageously employ substantial spring loads so as to avoid tendency to stick in operation.

Figure 2 shows a transmission comprising an input member 100 which can be clutched to one or other or both of clutch spinners 101, 102 by fluid pressure introduced by ports such as 56 and exhausted at duct 61. These spinners are connected by a shaft 103 and sleeve 104 to an epicyclic gearing 106 which is controlled by reaction brakes 107, 108, 109 by application of fluid pressure at ducts 60, 58, 57. Referring to Figure 3, the pressure is supplied by the pump 54 and the valve 55 provides a suitable pressure to actuate the reaction brakes of the transmission. The oil under pressure passes from this valve to the valve 58, action of which is already described. The valve 51 which may be moved manually or by automatic means, can take up four positions, and in the position shown oil pressure is led to the front clutch by means of duct 56 and to the rear brake by means of duct 57, in the next position (by movement to the right) pressure is still led to the front clutch and to the centre brake by means of the duct 58, duct 57 being exhausted by port 59 and exhaust 66. In the next position the front clutch still receives pressure through 56 and the oil passes through duct 60 to engage the front brake, the centre brake being exhausted by port 59. Further movement of the valve 51 to the right causes the front clutch to be engaged through duct 56 and the rear clutch to be engaged through duct 61 and the brakes are exhausted by means of ports 59, 62, 63 and exhausts 66, 67 and 68. In this position of the valve 51 the groove 52 disengages the duct 53 and the duct 53 is exhausted by means of port 64 and the drillings 65.

The suction 69 leads to the sump and the various exhausts return oil to the sump. An engine throttle 70 is shown.

I claim:

1. In a power transmission apparatus in which changes in ratio are made by engagement and disengagement of frictionally engaging devices operated by hydraulic pressure controlled by a relief valve in the form of a piston in a bore, said valve being associated with the throttle control member of the engine which drives the transmission apparatus so that the hydraulic pressure varies in accordance with the position of the throttle control member; the provision of a first spring which acts on the piston and provides a given minimum pressure, a second spring of higher rate than the first spring, a pin operatively connected to the throttle control member and arranged to effect compression of said second spring, said second spring being mounted within the relief valve piston and retained therein under compression and arranged to be ineffective when the throttle control member is completely released, but owing to its initial compression increasingly effective when the throttle opening is slightly increased, additional spring means of lower rating than the second spring, said spring means being carried by the pin so that when a given compression of the high rate spring is obtained by movement of the pin, the spring means will yield thereby providing a lower rate of increase with increased movement of the throttle control member.

2. An apparatus as claimed in claim 1 wherein the pin is associated with a second piston working in a bore connected to the hydraulic pressure system of the transmission, whereby the pressure acting on the piston will partially overcome the loads on the pin produced by the compression of the springs thereby reducing the load to be applied by a throttle pedal.

3. An apparatus as claimed in claim 1 wherein the second spring and spring means are under a normal compression, the normal loading on the second spring being less than that on the spring means.

4. An apparatus as claimed in claim 1 wherein the piston has a bore containing the second spring, and the pin carries an abutment having lost motion with respect to the second spring over the initial part of the throttle opening movement, and thereafter compressing the second spring, said abutment being slidably mounted on said pin, whereby the pin can move relatively to the abutment to compress the third spring.

5. An apparatus as claimed in claim 4 wherein the spring means is disposed between a second abutment which is fixed on the pin and a third abutment slidable on the pin.

6. An apparatus as claimed in claim 1 wherein the piston has an area exposed to counter fluid pressure aiding the springs which area is smaller than the area of the piston exposed to the fluid pressure which compresses the springs, said counter fluid pressure being controlled by a valve device which admits said counter fluid pressure to the piston in certain transmission ratios and cuts off said counter fluid pressure in at least one transmission ratio.

References Cited in the file of this patent

UNITED STATES PATENTS

| 2,697,363 | Sheppard | Dec. 21, 1954 |
| 2,720,120 | Orr et al. | Oct. 11, 1955 |
| 2,737,824 | Livermore | Mar. 13, 1956 |